June 8, 1971 M. GREEN 3,583,068
INSTRUMENT DESIGNED FOR SHAPING READY-MIXED
AND BAKED CAKES OR BREAD
Filed March 18, 1969 3 Sheets-Sheet 1
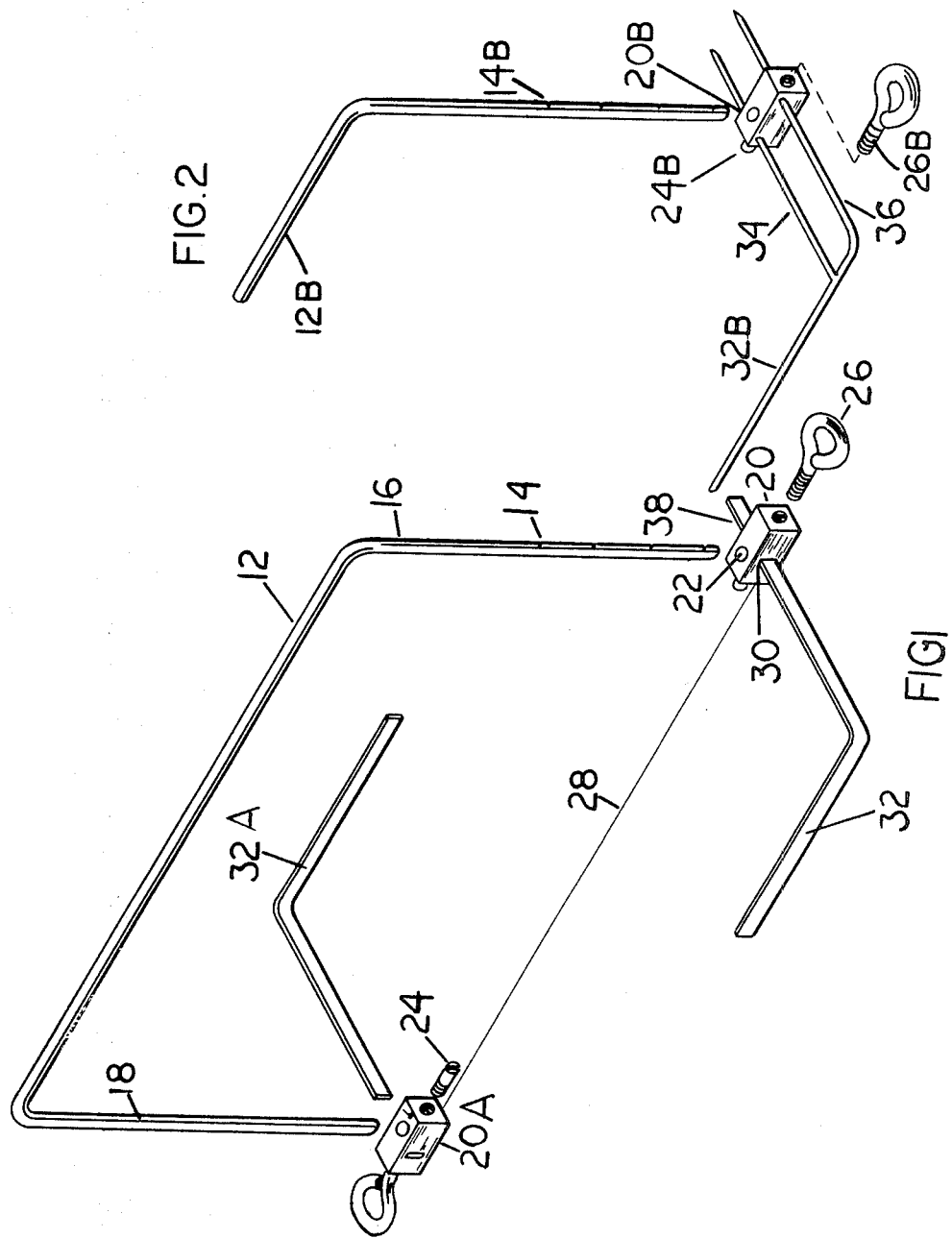

June 8, 1971 M. GREEN 3,583,068
INSTRUMENT DESIGNED FOR SHAPING READY-MIXED
AND BAKED CAKES OR BREAD
Filed March 18, 1969 3 Sheets-Sheet 2

June 8, 1971 M. GREEN 3,583,068
INSTRUMENT DESIGNED FOR SHAPING READY-MIXED
AND BAKED CAKES OR BREAD
Filed March 18, 1969 3 Sheets-Sheet 3
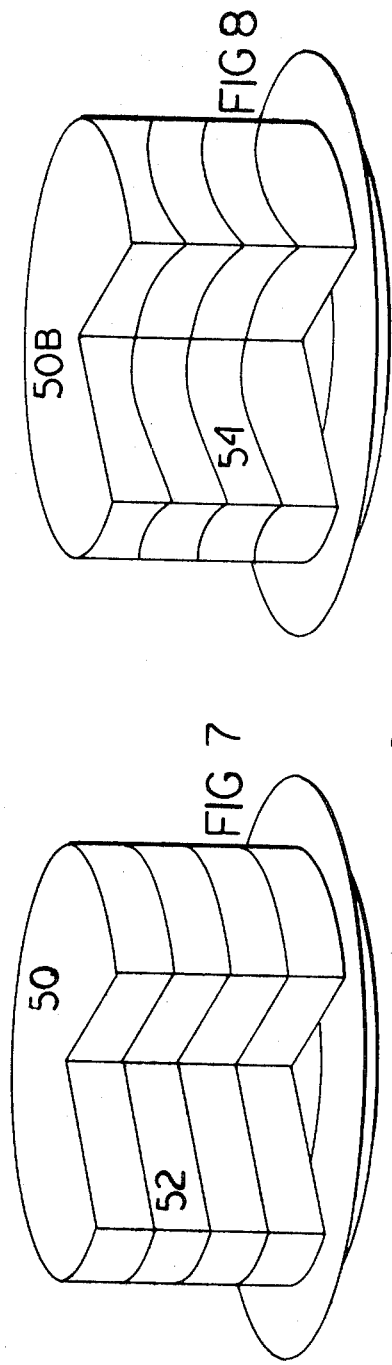
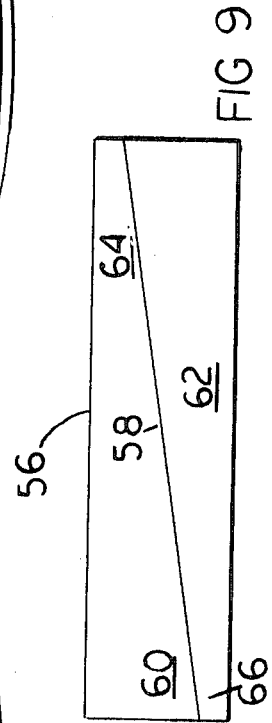
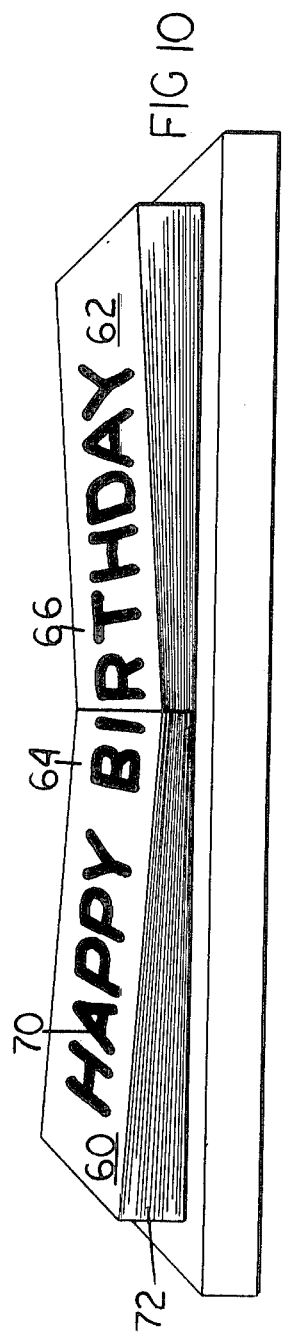

United States Patent Office 3,583,068
Patented June 8, 1971

3,583,068
INSTRUMENT DESIGNED FOR SHAPING READY-MIXED AND BAKED CAKES OR BREAD
Martin Green, Mahwah, N.J., assignor to No Limit Inventions, Inc., Mahwah, N.J.
Filed Mar. 18, 1969, Ser. No. 808,202
Int. Cl. B26b 29/00
U.S. Cl. 30—293                                            2 Claims

ABSTRACT OF THE DISCLOSURE

A shaping instrument for baked goods having an inverted U-shaped bracket. The legs enter box-like fixtures with a wire stretching therebetween. The fixtures are vertically adjustable along the legs. A slice measuring angle is also provided in the fixture.

---

The present invention relates to a shaping instrument which enables anyone that desires to bake, or buy a ready-made cake or bread to use the instrument for the purpose of slicing the cake or bread into desired designs or initials, or numbers.

Heretofore the average person trying to put a design on a cake had to use a knife to slice through the cake lengthwise or horizontally in order to put a filler in due to the width of the knife, and using free hand cutting, only by luck, the parts would be even. The present invention is directed to an instrument designed and constructed so that it can be used to cut to any desired thickness, horizontally or otherwise.

After the design is created with the instrument, the cake or bread can be separated and filled with a jam or mixture and then the parts can be put together and using the instrument can be sliced into portions and the design that has been put into the loaf will appear in every portion.

An object of the present invention is to provide an instrument whereby an adult or a child has the opportunity without skill to use their imagination, and shape a cake or bread to their desire due to the construction of the cutting instrument.

A further object of this invention is that the professional will have a greater opportunity to develop his art of baking and designing with this cake design instrument.

Another object of this invention is a scale arm that enables anyone to slice cake, bread, pie of any desired size.

One more object of this invention is the adaptibility of cutting size by means of a bracket that enables even small children to use with ease.

Still another object of this invention is that the instrument does not limit itself to cake, or bread only, but can be used for cheese loaf or meat loaf or any food that is cooked or baked in a loaf.

The invention and the further objects and advantages thereof will become more apparent from the following description when taken in connection with the accompanying drawing, in which:

FIG. 1 is a longitudinal perspective view of the device contemplated herein;

FIG. 2 illustrates a possible modification of the device illustrated in FIG. 1;

Figure 3:
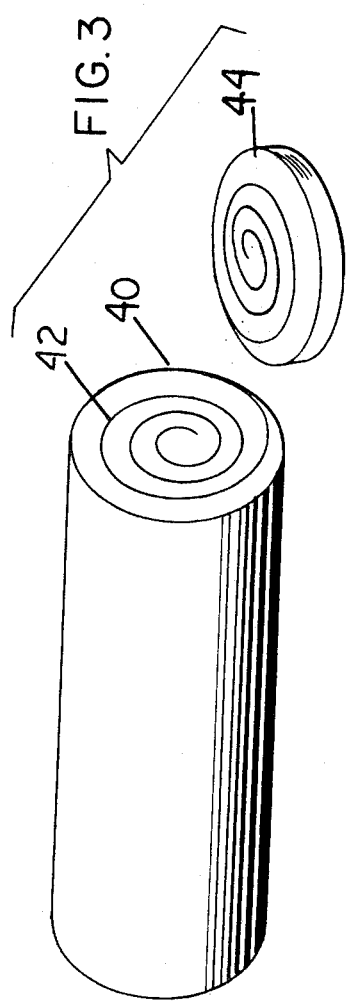
FIG. 3 shows in perspective how a cake roll can be made and decorative cut into slices.
Figure 4:
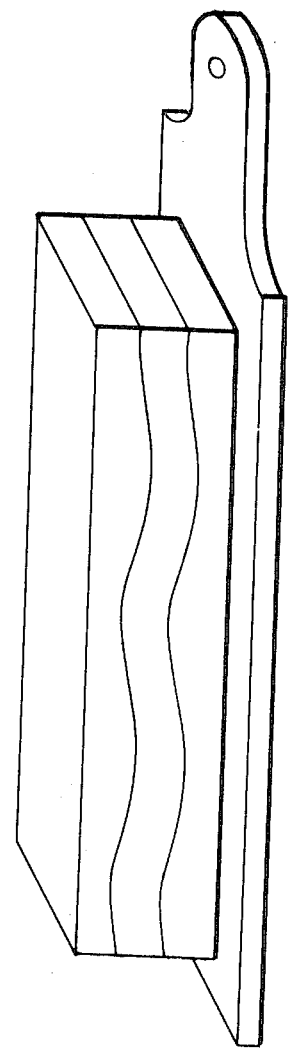
Figure 5:
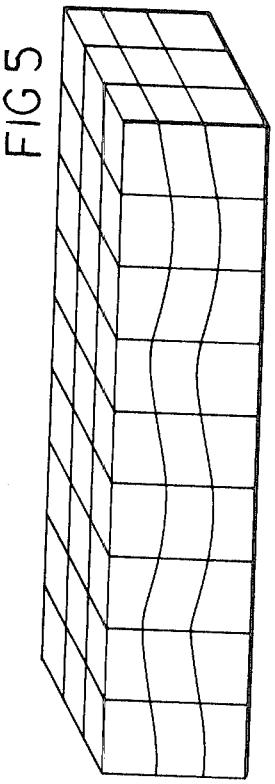
Figure 6:
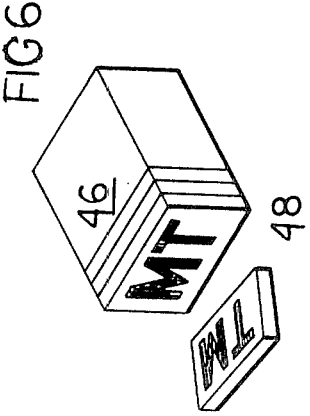

FIG. 4 presents one stage of decorative cutting;

FIG. 5 then shows the next stage of decorative cutting;

FIG. 6 depicts the formation of initials in a cake;

FIG. 7 shows the perspective in one type of cutting a round cake;

FIG. 8 shows in perspective another type of cutting of a round cake;

FIG. 9 presents the first step in cutting a book-shaped cake;

FIG. 10 then shows the next step in cutting a book-shaped cake.

Shown in FIG. 1 is an inverted U-shaped bracket 12 having working positions 14 defined on at least one leg thereof. The legs 16, 18 each enter a rectangular box-like retaining fixture 20, 20A with an upper aperture 22 therein and a side screw 24 for partially holding the bracket leg in the aperture. Also holding the bracket leg is a lock screw 26 disposed 180° away from the side screw for locking the fixture to the bracket leg. Extending between fixture 20, 20A is a cutting wire 28. The box-like retaining fixture 20, 20A has a lateral aperture 30 to hold a slice measurer right angle 32, 32A which passes therethrough and is retained therein by one or both of screws 24, 26. These box-like fixtures 20, 20A can be moved up and down along legs 16, 18, to make cuts as desired.

Instead of using slice measurer right angle 32, it is possible to use a device as shown in FIG. 2 wherein there is a box-like retaining fixture 20B having a side screw 24B and a lock screw 26 engaging leg 14B of bracket 12B as before. However, for a slice measurer, a two-pronged angle 32B with prongs 34, 36 is used which are retained in the box-like retaining fixture like the inner end 38 of slice measurer angle 32.

As heretofore pointed out, the instrument described is used to cut cake and bread and, for the purpose of illustrating the usefulness of the instrument, the following illustrative examples are given:

EXAMPLE I (FIG. 3)

Jelly roll

A cylindrically shaped loaf 40 is baked. The instrument with the cutting wire parallel to the top of bracket 12 is used in a spiral motion to cut the cylindrical loaf spirally 42. The loaf is unrolled and filled with a jelly, then rerolled. The loaf can then be cut into slices 44.

EXAMPLE II (FIGS. 4 AND 5)

Wave-shaped portions

A rectangular cake is first cut in the longitudinal direction with a wavy motion then in the lateral direction likewise using wavy motions.

EXAMPLE III (FIG. 6)

Initials

A first inward cut is made into a rectangular loaf 46 with the cutting edge parallel to the longitudinal axis. The initial is then cut, and an outward cut is made to remove the cutting wire. The top half is removed, the initial cut space is filled with a jelly, the two halves are reassembled. Slices 48 will have the initials therein.

EXAMPLE IV (FIGS. 7 AND 8)

For a round cake 50, 50B cuts are made parallel to the horizontal 52 or in a wavy shape 54.

EXAMPLE V (FIGS. 9 AND 10)

Open book

The box-like fixtures are angularly offset.

A rectangular cake 56 is used. A diagonal cut 58 is made. Then there are two wedge shaped halves 60, 62 having narrow ends 64, 66. The narrow ends are aligned as in FIG. 10 and the jelly text decoration 70 can be inserted as in Example 3. Additional cuts 72 can be made along the edges to simulate pages.

EXAMPLE VI

Slices

The slice measurer angles are used. The angle is sequentially positioned in the location of the previous slice.

In addition to the foregoing examples, various other decorations can be made by moving the box-like retaining fixtures vertically along arms 16, 18. For this objective, use is made of the working positions 14. Wire 28 is always under tension.

It is to be observed that the present invention provides for an instrument for shaping baked goods and comprises, an inverted U-shaped bracket with an elongated straight narrow top and two outer parallel legs, a pair of box-like fixtures for retaining said legs having a wire stretching therebetween, said fixtures having lateral apertures for the passage therethrough of a slice measuring angle; and, screw means to lock said fixtures in place.

I claim:

1. An instrument for shaping baked goods, comprising in combination:
   (a) an inverted U-shaped bracket with an elongated straight narrow top and two outer parallel legs;
   (b) a pair of vertically adjustable box-like fixtures for retaining said legs having a wire stretching therebetween, said fixtures having lateral apertures for the passage therethrough of a slice measuring angle; and
   (c) screw means to lock said fixtures in place and for adjusting the vertical position thereof.

2. The device claimed in claim 1 including a two-pronged lateral opening for the passage therethrough of lateral double legs of a slice measuring angle.

References Cited

UNITED STATES PATENTS

| | | | |
|---|---|---|---|
| 2,475,824 | 7/1949 | Devine | 30—116 |
| 2,825,131 | 3/1958 | Cole | 30—116 |
| 2,964,844 | 12/1960 | Steward | 30—116 |
| 3,388,469 | 6/1968 | Neiiendam | 30—116 |
| 3,435,524 | 4/1969 | Moore | 30—116X |

LESTER M. SWINGLE, Primary Examiner

J. C. PETERS, Assistant Examiner

U.S. Cl. X.R.

30—116